United States Patent Office 2,767,791
Patented Oct. 23, 1956

2,767,791

METHOD OF PREVENTING RETROGRADE CONDENSATION IN GAS FIELDS

Willem Johannes Dominicus van Dijck, The Hague, Netherlands, assignor to Shell Development Company, New York, N. Y., a corporation of Delaware No Drawing. Application October 7, 1954, Serial No. 461,026

7 Claims. (Cl. 166—7)

This invention relates to the production of gas fields and pertains more particularly to a method of treating the gas-producing formations of a field which is exclusively or practically exclusively a gas-producing field such as a natural distillate-type field, by injecting a heated fluid into such field.

When producing gases from a gas-producing field it is customary to inject fluid, such as gases and water, under pressure into the producing formations or formations adjacent said producing formation in order to maintain the pressure of the gas field at the required level.

It is an object of this invention to provide a method for preventing retrograde condensation in gas fields and thereby increasing the amount, or reducing the loss, of valuable hydrocarbons which are available from the gas zone and which are often lost in the formation as a result of retrograde condensation due to gas production.

A further object of this invention is to provide a method for repressuring a gas field whereby the field may be produced until a pressure is reached which is lower than that which is normally required without loss of valuable hydrocarbon compounds of the gas.

Another object of the present invention is to provide a method for repressuring a gas field at a comparatively low cost by employing an amount of heated gas or other heated fluid which is substantially smaller than the amount of gas or fluid normally used to repressure a gas field, when the said amounts are compared under standard conditions.

These and other objects of this invention will be understood from the following description of the invention.

The present invention is predicated upon the discovery that a substantial increase in production may be realized from fields which produce gas exclusively, or practically exclusively, by repressuring said fields through the injection of hot fluids. According to this invention, losses which occur in a gas-producing field through retrograde condensation as a result of gas production are avoided or reduced substantially by injecting into such field a fluid such as a hot gas or vapor, which has a temperature higher than that of the field. A particularly suitable fluid for this purpose is high temperature steam or a mixture of high temperature steam and gas, the steam having such a pressure or partial pressure respectively that, at the conditions of pressure and temperature of the formation where retrograde condensation is likely to occur substantial condensation of the steam takes place.

By the injection of a hot fluid into the gas-producing field it is possible for the temperature of the field to be raised and reservoir conditions to be maintained in a range outside the pressure and temperature limits within which retrograde condensation of the natural gas can occur. This can often be effected by a comparatively slight rise in the temperature of the field, and thus the present invention can, under certain circumstances, have quite a favorable effect at a comparatively low cost.

Furthermore, since the temperature of the formation is raised, the pressure during the development of the field can be allowed to drop to a lower value than normally required before losses due to retrograde condensation begin to occur. The application of hot gases for repressuring a gas-producing field has the added advantage that in order to keep or bring a field up to pressure, a lesser weight of gas will suffice than would be required if relatively cold gases, or gases having only the temperature of the field, were to be used.

It is desirable to begin injecting the hot fluid early and often immediately after the field has started producing, so that from the very beginning such conditions of pressure and/or temperature are maintained that retrograde condensation will not occur. If, however, the field has a very high initial pressure (so high that when the pressure is reduced as a result of production no retrograde condensation can occur) it is more advantageous to postpone injecting until the pressure has dropped to a suitable level. By doing so the necessity of having to compress the gases prior to injection to excessively high pressures is avoided, while production outside the area of retrograde condensation is ensured.

As is well known to the art of gas production and cycling operation, a gas which is produced from a gas field is stripped of valuable, usually the higher molecular, components, such as butane and higher components, the gases being subsequently compressed and injected back into the gas field. In practicing the present invention the gas to be recycled is heated, after compression, but before injection, to a temperature higher than that of the gas produced by the field. For example, this can be done effectively by passing the gas to be injected, after it has been compressed, through a heat exchanger which may be heated by the hot-exhaust gases of the engines used to drive the compressors for the gas. It is also possible to burn part of the gas to furnish additional heat to the heat exchangers if necessary.

As retrograde condensation occurs soonest near the producing wells heat may be applied to the corresponding part of the formation by temporarily shutting off one or more of the producing wells and injecting hot gases or vapors, especially high temperature steam, into said wells so as to avoid losses due to retrograde condensation which otherwise would occur at sustained production.

I claim as my invention:

1. A method of repressuring a field producing substantially exclusively gaseous hydrocarbons, said method being characterized by the injection into the gaseous hydrocarbon producing formation of hot gases at a temperature higher than that of the producing formation and sufficiently high to substantially reduce losses due to retrograde condensation.

2. A method of repressuring a field producing substantially exclusively gaseous hydrocarbons, said method comprising the steps of producing a gas from the producing formation, stripping the higher molecular hydrocarbon components from the gas, compressing at least a portion of the gas, heating said compressed portion of gas to a temperature higher than that of the producing formation and subsequently injecting said heated and compressed gas into said producing formation, to substantially reduce losses due to retrograde condensation as a result of gas production.

3. A method of repressuring a field producing substantially exclusively gaseous hydrocarbons, said method comprising the steps of producing a gas from the producing formation, stripping the higher molecular weight hydrocarbon components from the gas, compressing at least a portion of the gas, heating the compressed portion of said gas by passing said gas in heat exchange relationship with hot compressor engine exhaust gases, and subsequently injecting said heated and compressed gas into the producing zone of said gas field to substantially reduce losses due to retrograde condensation occurring as a result of gas production.

4. The method of repressuring a field producing substantially exclusively gaseous hydrocarbons, said method comprising the steps of stripping the higher molecular weight components from the gas produced from the field, compressing at least a portion of said gas, heating said compressed portion of said gas by injecting thereinto a volume of high temperature steam, and subsequently reinjecting said compressed and heated portion of said gas into the producing formation of the gas field to substantially reduce losses due to retrograde condensation occurring as a result of gas production.

5. A method of repressuring a field producing substantially exclusively gaseous hydrocarbons as claimed in claim 4, comprising injecting into the producing formation hot gas containing steam the partial pressure of which is so high that at the conditions of temperature and pressure prevailing in the formation substantial condensation of the steam occurs.

6. A method of repressuring a field producing substantially exclusively gaseous hydrocarbons as claimed in claim 1, comprising the alternating steps of introducing into a well a hot gas to keep the temperature in the vicinity of the well so high as to avoid substantially retrograde condensation and producing gaseous hydrocarbons from the field by said well.

7. A method of repressuring a field producing substantially exclusively gaseous hydrocarbons as recited in claim 3 comprising injecting into the producing formation hot gas containing steam the partial pressure of which is so high that at the conditions of temperature and pressure prevailing in the formation substantial condensation of the steam occurs.

References Cited in the file of this patent
UNITED STATES PATENTS

| 1,263,618 | Squires | Apr. 23, 1918 |
|---|---|---|
| 1,491,138 | Hixon | Apr. 22, 1924 |
| 2,148,717 | Whitney | Feb. 28, 1939 |
| 2,601,599 | Deming | June 24, 1952 |